United States Patent [19]

Tenhover et al.

[11] Patent Number: 5,162,159
[45] Date of Patent: Nov. 10, 1992

[54] METAL ALLOY COATED REINFORCEMENTS FOR USE IN METAL MATRIX COMPOSITES

[75] Inventors: Michael A. Tenhover, Solon; Dorothy Lukco, Sagamore Hills, both of Ohio

[73] Assignee: The Standard Oil Company, Cleveland, Ohio

[21] Appl. No.: 791,731

[22] Filed: Nov. 14, 1991

[51] Int. Cl.$^5$ .............................................. C22C 1/09
[52] U.S. Cl. .................................... 428/614; 428/570; 428/357; 428/361; 428/375; 428/388; 428/389
[58] Field of Search ............... 420/416; 428/570, 655, 428/663, 665, 614, 367, 389, 379, 388, 359, 361, 357; 501/91; 427/123, 404

[56] References Cited

U.S. PATENT DOCUMENTS

| 3,556,836 | 1/1971 | Basche et al. | 428/366 |
| 3,620,799 | 11/1971 | Hoelscher et al. | 428/570 |
| 3,700,486 | 10/1972 | Veltri et al. | 428/379 |
| 3,811,920 | 5/1974 | Galasso et al. | 428/366 |
| 3,867,191 | 2/1975 | Galasso et al. | 428/389 |
| 4,132,828 | 1/1979 | Nakamura et al. | 428/366 |
| 4,180,399 | 12/1979 | Asada et al. | 75/236 |
| 4,376,803 | 3/1983 | Katzman | 428/389 |
| 4,511,663 | 4/1985 | Taylor | 501/4 |
| 4,642,271 | 1/1987 | Rice | 428/698 |
| 4,770,935 | 9/1988 | Yamamura et al. | 428/366 |
| 4,853,294 | 8/1989 | Everett et al. | 428/614 |
| 5,045,407 | 9/1991 | Ritter | 428/614 |

FOREIGN PATENT DOCUMENTS

| 62-174377 | 7/1987 | Japan | 428/614 |
| 64-040163 | 2/1989 | Japan |  |

Primary Examiner—Gary P. Straub
Assistant Examiner—Ngoc-Yen Nguyen
Attorney, Agent, or Firm—Larry W. Evans; John E. Miller

[57] ABSTRACT

Coated reinforcement material for metal matrix composites comprising a carbon or silicon-containing reinforcement having a coating of the general formula:

$$A_{100-x} M_x$$

wherein A is at least one of Y, Gd, Tb, Dy, Ho, Er, Tm, Yb and Lu; M is at least one of Mo, W or Re; and x is from about 10 to about 90.

19 Claims, 1 Drawing Sheet

METAL ALLOY COATED REINFORCEMENTS FOR USE IN METAL MATRIX COMPOSITES

FIELD OF THE INVENTION

This invention relates to reinforcements for metal matrix composites that are mechanically and thermally stable. More particularly, this invention relates to high strength carbon or silicon containing reinforcements coated with the composition $A_{100-x}M_x$, where A is at least one of Y, Gd, Tb, Dy, Ho, Er, Tm, Yb and Lu; M is at least one of Mo, W and Re; and x is from 10 to about 90.

BACKGROUND OF THE INVENTION

Composite materials of metals and reinforcing carbon or Si-containing fibers are useful as light-weight structural materials having both the high elasticity, high strength and light weight of the carbon or Si-containing fibers and the shapability, heat stability, electrical conductivity and heat conductivity of the metals. In particular, the usefulness of SiC fibers as reinforcements in metal matrices such as aluminum and magnesium is recognized in the industry. However, the reactivity of SiC is sufficiently high to require the use of relatively low temperature or shorter processing time at high temperature during fabrication of the fiber reinforced metal composites in order to prevent fiber degradation. In addition, the reactivity of SiC limits the choice of metal matrix material and further, may well define the temperature to which the composite is limited in operation.

Carbon fibers have excellent strength and modulus of elasticity, but very bad wetting property with respect to a matrix such as molten aluminum. Furthermore, carbon fibers tend to react with molten aluminum at high temperatures and cause a drastic reduction in the strength of the resulting composite material. Thus, if the carbon fibers are directly used to reinforce composite materials, the resulting products cannot possess the desired mechanical strength.

It is known that many fiber-matrix combinations undergo extensive chemical reaction or interdiffusion between the fiber and matrix materials, each of which is likely chosen for the contribution of specific mechanical and/or physical properties to the resulting composite. Such reaction or interdiffusion can lead to serious degradation in strength, toughness and temperature stability. The fiber-matrix interface is therefore very important to preventing or minimizing chemical reactions and interdiffusion.

Surface modification of the fibers is an effective means to control the fiber-matrix interface. This can be accomplished by coating the fibers with a suitable composition to inhibit the fibers from reacting or bonding with the matrix.

A variety of coatings have been suggested for reinforcements intended for use in fiber-matrix composites. For example, U.S. Pat. No. 3,811,920 to Galasso et al. discusses applying a thin layer of TiC to a filamentary substrate having a SiC surface layer. The TiC layer is reported to impart oxidation resistance to the filament and the matrix metals. Boron nitride has also been used as a SiC coating, as in U.S. Pat. No. 4,642,271 to Rice.

U.S. Pat. No. 3,867,191 to Galasso et al. discloses coating a carbon filament with an amorphous carbon-boron alloy for use in a metal matrix.

U.S. Pat. No. 4,511,663 to Taylor discloses metal coated carbon fiber reinforcements which are used in a glass or glass-ceramic matrix.

Composite materials which have employed coatings such as the foregoing nonetheless remain limited for high temperature application because of concerns regarding the thermomechanical stability, thermochemical stability and high temperature fatigue resistance encountered at temperatures around 1000° C.

It is an object of the present invention, therefore, to provide a coating for carbon or Si-containing reinforcements which permits the use of the reinforcement in metal composite materials for use at high temperatures.

Another object of the invention is to provide a coating for carbon or Si-containing reinforcement which prevents chemical reaction between the fiber and the matrix.

SUMMARY OF THE INVENTION

The subject invention relates to a coated reinforcement material comprising a carbon or silicon-containing reinforcements having a coating of the general formula:

$$A_{100-x}M_x$$

wherein A is at least one of Y, Gd, Tb, Dy, Ho, Er, Tm, Yb and Lu; M is at least one of Mo, W or Re; and x is from about 10 to about 90.

The invention further relates to a high strength, high temperature performance composite comprising a metal coated carbon or Si-containing reinforcement material and a metal matrix material selected from the group consisting of Ti, Al, Si, B and alloys thereof.

DETAILED DESCRIPTION OF THE INVENTION

The present invention has resulted from the discovery that a metal coated carbon or Si-containing reinforcement which is incorporated into a metallic matrix produces a high strength, high temperature reinforced composite material. The outer metal coatings disclosed herein are of the general formula:

$$A_{100-x}M_x$$

wherein A is at least one of Y, Gd, Tb, Dy, Ho, Er, Tm, Yb and Lu; M is at least one of Mo, W and Re; and x is from 10 to about 90.

The preferred value of x depends on the composition of the matrix into which the coated reinforcement is to be incorporated. For alpha Ti alloys, such as Ti and Ti-6Al-4V, and for beta Ti alloys, such as Ti—15V—3-Cr—3Sn—3Al, Ti—15Mo and Ti—20Nb, x is preferably from about 10 to about 90. For intermetallic alloys, such as $Ti_3Al$, TiAl and $TiTaAl_2$, x is preferably from about 30 to about 90.

The carbon or Si-containing reinforcement may be in the form of fibers or monofilaments, such as SiC fibers commercially available from DWA Composite Specialties, Inc., Chatsworth, California, under the Trademark BP Sigma Fibers. The reinforcement may further be amorphous, polycrystalline or microcrystalline in nature.

Before the Si-containing reinforcement such as SiC, $Si_3N_4$, SiAlON, SiCON, is coated with the outer metallic coating as described herein, an interface coating of carbon or BN may be deposited on the Si-containing reinforcement. This interface coating is between about 0.25 microns to 1 micron thick, and is deposited by conventional vapor deposition methods.

The outer metallic coating can be applied by any known means, but is preferably applied by sputtering, chemical vapor deposition, or evaporation. The coating is prepared at temperatures ranging from room temperature to approximately 1000° C. The thickness of the outer metallic coating is about 0.5 microns to about 5.0 microns. Trace amounts of N, C, O, Si and B may be present in the coating. The structure of the coating can be amorphous, microcrystalline, or polycrystalline and can be single phase or multi-phase.

Figure 1:
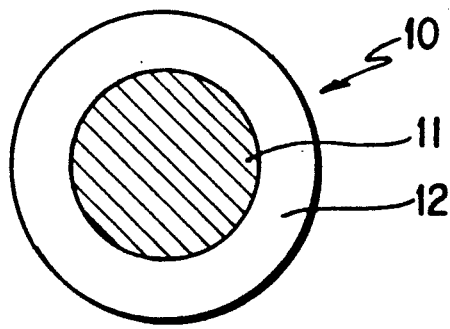
FIG. 1 represents a cross-section of a carbon or Si-containing fiber having an outer metal coating.

FIG. 1 is a cross-section of a coated reinforcement material 10 wherein the carbon or Si-containing reinforcement fiber 11 has been coated with an outer metallic coating 12 as described herein.

Figure 2:
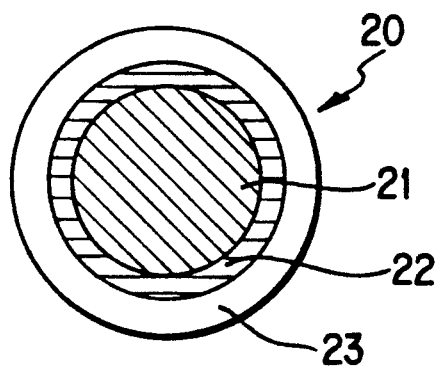
FIG. 2 represents a cross-section of a coated Si-containing fiber having an interface coating between the Si-containing reinforcement and the outer metal coating.

FIG. 2 is a cross-section of a coated reinforcement material 20 wherein the Si-containing reinforcement fiber 21 has been coated with an outer metallic coating 23 as described herein. A carbon or BN interface coating 22 is interposed between the Si-containing reinforcement fiber 21 and the outer metallic coating 23.

It may be advantageous, depending on the use of the material, to form the reinforcement by depositing a carbon or Si-containing composition on a core material which possesses a very high melting point prior to deposition of the metallic coating. Such core material would typically be carbon or a refractory metal, such as W, Mo, Ti, among others, each of which is commercially available, such as those available from Stackpole Fibers Company and Alfa Inorganics.

Figure 3:
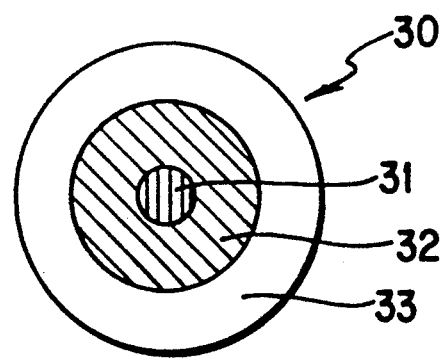
FIG. 3 represents a cross-section of a coated Si-containing fiber having a core of a different composition.

FIG. 3 is a cross-section of a coated reinforcement material 30, having a core 31, coated with a carbon or Si-containing layer 32, which is then coated with the outer metallic layer 33 as described herein.

Prior to coating the metallic layer onto the reinforcements, the reinforcements may be pretreated to enhance the adherence of the coating to the reinforcement and the smoothness of the reinforcement-coating interface. Such pretreatment processes may include chemical etching, ion etching, flame polishing and mechanical polishing, among others.

Suitable metallic matrix materials into which reinforcements coated according to this disclosure are to be incorporated include Ti, Al, Si, B and alloys thereof, among others. Examples of representative matrix materials suitable for use in the subject invention include: Ti, $Ti_3Al$, TiAl, Ti—6Al—4V, Ti—15V—3Cr—3Sn—3Al, and $TiTaAl_2$. The coated reinforcement may be combined with the selected matrix material by any of a number of methods and techniques known to those skilled in the art, such as hot pressing or melt infiltration, among others.

EXAMPLES

The following experimentation was conducted to demonstrate the stability of various coating compositions for Si-containing reinforcements. The samples prepared and tested in the following examples were of the structure:

matrix/coating/reinforcement wherein coating refers to the outer metallic coating and the interface coating, if any, as well as comparative coatings. Matrix, for purposes of these examples, refers to an arc-melted Ti alloy that has been finely polished. The coating and reinforcement layers were applied to the matrix using magnetron sputtering and a commercial S-gun arrangement. The reinforcement was sputtered SiC.

A typical procedure was to mount the polished matrix in a cryopumped (base pressure $2 \times 10^{-7}$ torr) vacuum chamber that rotated about the sputter gun to insure an even coverage of the materials. One S-gun was used to deposit the coating layer (0.1 to 1.0 microns) while the reinforcement (0.1 to 100 microns) could be deposited using the other S-gun, thus avoiding the need to break the vacuum between the deposition of the two layers. The sputtering was performed in an argon atmosphere, at a pressure of 1.5 mtorr.

The foregoing process produced smooth, dense, adherent coatings. The thickness of the coating and the reinforcement were determined by a TM-100 thickness monitor in the vacuum chamber.

Following deposition, the samples were tested by exposure at temperatures ranging from 600° to 800° C. in a sealed fused silica tube. Table I reports the stability, or extent of reaction, for various samples prepared as described herein. As can be seen, those samples in which the SiC reinforcement has been coated with a metallic coating according to the subject invention (1 and 2), experienced slight or no reaction between the coating and matrix, compared to the comparative examples (3-9) which did not contain metallic coated SiC reinforcements according to the present invention.

TABLE I

| Sample | Coating | Matrix | Heat Treatment | Result |
|---|---|---|---|---|
| 1 | $Y_{19}W_{81}$ | Ti—15V—3Cr—3Al—3Sn | 700° C./4 hrs | stable |
| 2 | $Y_{17}W_{83}$ | $Ti_3Al$ | 700° C./4 hrs | stable |
| 3 | Carbon | Ti—15V—3Cr—3Al—3Sn | 700° C./4 hrs | unstable |
| 4 | TiC | Ti—6Al—4V | 800° C./4 hrs | unstable |
| 5 | $TiB_2$ | Ti—15V—3Cr—3Al—3Sn | 700° C./4 hrs | unstable |
| 6 | $TiB_2$ | $Ti_3Al$ | 700° C./4 hrs | unstable |
| 7 | SiC | Ti—15V—3Cr—3Al—3Sn | 700° C./4 hrs | unstable |
| 8 | BN | TiAl | 800° C./4 hrs | unstable |
| 9 | TiN | Ti—6Al—4V | 700° C./4 hrs | unstable |

X-ray Photoelectron Spectroscopy (XPS) was used to determine the extent of reaction between the coatings and the various matrix materials. The XPS spectra were acquired on a PHI 5400 XPS instrument using 300 watt Mg K$\alpha$ x-rays, 1 mm diameter spot size, and 35.75 pass energy. Survey spectra were taken so that all surface components could be identified and higher resolution narrow region scans could then be obtained. The pressure in the main analysis chamber was in the $10^{-10}$ torr range.

XPS depth profiles were taken of the samples with and without the heat treatment. Of primary importance to the question of stability of the matrix/coating/reinforcement combination is the diffusion of titanium from the matrix into the coating. A measure of the effectiveness of the coating is the amount of titanium observed in the middle of the coating following the heat treatment. Table II reports the ratio of Ti atoms to other metallic atoms (Ti/metals) in the middle of the coating. Ratios greater than about 0.25 indicate diffusion of Ti into the coating and the failure of the coating to protect the reinforcement from the matrix. Ratios near 0.0 indicate excellent performance and minimal or no Ti diffusion, and correspond to stable composite properties. As Table II shows, only the metallic coatings of the present invention, samples 1 and 2, demonstrate little or no titanium diffusion following heat treatment.

TABLE II

| Sample | Coating | Matrix | Heat Treatment | Ratio |
|---|---|---|---|---|
| 1 | $Y_{19}W_{81}$ | Ti—15V—3Cr—3Al—3Sn | 700° C./4 hrs | 0.00 |
| 1A | $Y_{19}W_{81}$ | Ti—15V—3Cr—3Al—3Sn | none | 0.00 |
| 2 | $Y_{17}W_{83}$ | $Ti_3Al$ | 700° C./4 hrs | 0.004 |
| 2A | $Y_{17}W_{83}$ | $Ti_3Al$ | none | 0.00 |
| 3 | carbon | Ti—15V—3Cr—3Al—3Sn | 700° C./4 hrs | 0.88 |
| 3A | carbon | Ti—15V—3Cr—3Al—3Sn | none | 0.00 |
| 10 | carbon | $Ti_3Al$ | 700° C./4 hrs | 0.65 |
| 10A | carbon | $Ti_3Al$ | none | 0.00 |

The foregoing examples are not intended to limit the subject invention, the breadth of which is defined by the specification and the claims appended hereto, but are presented rather to aid those skilled in the art to clearly understand the invention defined herein.

What we claim is:

1. A coated reinforcement comprising:
   a reinforcement having a composition selected from the group consisting of carbon, SiC, $Si_3N_4$, SiAlON and SiCON and having a structure selected from the group consisting of continuous fibers, chopped fibers, whiskers and platelets; and
   an outer coating deposited on said reinforcement having the formula:

$$A_{100-x}M_x$$

wherein A is at least one of Y, Gd, Tb, Dy, Ho, Er, Tm, Yb, and Lu; M is at least one of Mo, W and Re; and x is from about 10 to about 90.

2. A coated reinforcement material as in claim 1 wherein said reinforcement is selected from the group consisting of SiC, $Si_3N_4$, SiAlON and SiCON.

3. A coated reinforcement material as in claim 2 further comprising an interface coating selected from the group consisting of carbon and boron nitride interposed between said reinforcement and said outer coating and adjacent to said reinforcement.

4. A coated reinforcement comprising:
   a core material; and
   an inner coating on said core material, said coating having a composition selected from the group consisting of carbon, SiC, $Si_3N_4$, SiAlON, SiCON; and
   an outer coating on said inner coating, said outer coating having the formula:

$$A_{100-x}M_x$$

wherein A is at least one of Y, Gd, Tb, Dy, Ho, Er, Tm, Yb and Lu; M is at least one of Mo, W and Re; and x is from about 10 to about 90.

5. A coated reinforcement material as in claim 4 wherein said core material is selected from the group consisting of C, W, Mo and Ti.

6. A coated reinforcement material as in claim 1 wherein said outer coating is deposited by a vapor deposition process.

7. A coated reinforcement material as in claim 1 wherein said outer coating is from about 0.5 microns to about 5 microns thick.

8. A coated reinforcement material as in claim 1 wherein said reinforcement is amorphous.

9. A coated reinforcement material as in claim 1 wherein said reinforcement is polycrystalline.

10. A coated reinforcement material as in claim 1 wherein said reinforcement is microcrystalline.

11. A coated reinforcement material as in claim 3 wherein said interface coating is deposited by a vapor deposition process.

12. A coated reinforcement material as in claim 3 wherein said interface coating is from about 0.25 microns to about 1 micron thick.

13. A reinforced composite comprising:
    a coated reinforcement comprising a reinforcement having a composition selected from the group consisting of carbon SiC, $Si_3N_4$, SiAlON and SiCON and having a structure selected from the group consisting of continuous fibers, chopped fibers, whiskers and platelets; and an outer coating deposited on said reinforcement having the formula:

$$A_{100-x}M_x$$

wherein A is at least one of Y, Gd, Tb, Dy, Ho, Er, Tm, Yb and Lu; M is at least one of Mo, W and Re; and x is from about 10 to about 90; and
    a matrix material into which said coated reinforcement is incorporated.

14. A composite as in claim 13 wherein said matrix material is selected from the group consisting of Ti, Al, Si, B and alloys thereof.

15. A composite as in claim 13 wherein said reinforcement is selected from the group consisting of SiC, $Si_3N_4$, SiAlON and SiCON.

16. A composite as in claim 15 wherein said coated reinforcement material further comprises an interface coating selected from the group consisting of carbon and boron nitride interposed between said reinforcement and said outer coating and adjacent to said reinforcement.

17. A composite as in claim 14 wherein said matrix material is selected from the group consisting of $Ti_3Al$, TiAl and $TiTaAl_2$.

18. A composite as in claim 17 wherein x is from about 30 to about 90.

19. A reinforced composite comprising
a core material; and an inner coating on said core material, said coating having a composition selected from the group consisting of carbon, SiC, $Si_3N_4$, SiAlON, SiCON; and an outer coating on said inner coating, said outer coating having the formula:

$$A_{100-x}M_x$$

wherein A is at least one of Y, Gd, Tb, Dy, Ho, Er, Tm, Yb and Lu; M is at least one of Mo, W and Re; and x is from about 10 to about 90.
a matrix material into which said coated reinforcement is incorporated.

* * * * *